Patented Mar. 15, 1938

2,111,032

UNITED STATES PATENT OFFICE 2,111,032

METHOD OF PURIFYING FUSED METALS

Otto Nielsen, Ilsenburg at the Harz, Germany

No Drawing. Application December 20, 1934, Serial No. 758,476. In Germany December 20, 1933

5 Claims. (Cl. 75—93)

The removal of certain impurities from fused metals cannot be carried out by the known ordinary purifying methods. Thus, for example, it is not possible economically to remove selenium from copper when melted. The purification of copper containing selenium can be effected electrolytically; this process is, however, more expensive than refining in a furnace and is economical only with a recoverable content of noble metal. Since it has hitherto been impossible to remove selenium by refining in a furnace, it has been necessary to use the more expensive method even with copper which is free from noble metals in order to remove the very detrimental impurity and thereby make the copper generally useful. The same applies also to other non-ferrous metals, especially lead, zinc, etc.

By the new method it is possible to remove impurities such as selenium, tellurium etc., from fused metals in an economical manner without electrolysis or other expensive lixiviation process.

The method consists in treating the fused metal under non-oxidizing conditions with suitable alkali compounds together with reducing agents.

It is very economical to use soda as the alkali and carbon as the reducing agent but other alkalies with other reducing agents will produce the same result.

The chemical reactions which occur in the method are very complicated. In the treatment of copper containing selenium, for example, alkali selenides and selenites are formed which pass into the slag, from which selenium can be recovered. It is necessary to ensure that there is no return of the impurity which has been removed, by maintaining a reducing or neutral atmosphere or by avoiding oxidizing influences as long as the fused metal remains in contact with the slag.

The treatment of the metal bath with alkalies and reducing agents can be carried out either by throwing them on the metal bath, by blowing in below the surface of the metal bath in powder form, by placing the treatment substances on the bottom of the container before pouring in the metal and then allowing the metal to run over them, or by any known method for obtaining reaction between added substances and fused materials.

It is very advantageous to heat a mixture of soda and carbon until it forms a frit and then to carry out the treatment in the manner described with this fritted material conglomerate.

Having now particularly described and ascertained the nature of my said invention and in what manner the same is to be performed, I declare that what I claim is:

1. The process of purifying a fused non-ferrous metal from elements of the group consisting of selenium and tellurium, which consists in adding a mixture of a suitable alkali compound and a reducing agent to the molten metal to form a reducing slag, and avoiding oxidizing influences while the metal to be purified remains in the molten state and while the metal remains in reactive contact with the slag.

2. The process of purifying a fused non-ferrous metal from elements of the group consisting of selenium and tellurium, which consists in adding a mixture of a suitable alkali compound and a reducing agent to the molten metal thereby forming a reducing slag, and maintaining a non-oxidizing atmosphere while the metal to be purified remains in the molten state and while the metal remains in reactive contact with the slag.

3. The process of purifying a fused non-ferrous metal from elements of the group consisting of selenium and tellurium, which consists in adding a mixture of soda and carbon to the molten metal thereby forming a reducing slag, and avoiding oxidizing influences while the metal to be purified remains in the molten state and while the metal remains in reactive contact with the slag.

4. The process of purifying a fused non-ferrous metal from elements of the group consisting of selenium and tellurium, which consists in adding a mixture of soda and carbon to the molten metal thereby forming a reducing slag, and maintaining a non-oxidizing atmosphere while the metal to be purified remains in the molten state and while the metal remains in reactive contact with the slag.

5. The process of purifying a fused non-ferrous metal from elements of the group consisting of selenium and tellurium, which consists in fritting together a mixture of soda and carbon to produce a conglomerate and treating the molten metal with said conglomerate thereby forming a reducing slag, avoiding oxidizing influences while the metal to be purified remains in the molten state and while the metal remains in reactive contact with the slag.

OTTO NIELSEN.